(12) United States Patent
Wang

(10) Patent No.: US 8,909,910 B2
(45) Date of Patent: *Dec. 9, 2014

(54) COMPUTER SYSTEM FOR SELECTIVELY ACCESSING BIOS BY A BASEBOARD MANAGEMENT CONTROLLER

(75) Inventor: Hao-Hao Wang, Shanghai (CN)

(73) Assignee: Inventec Corporation, Taipei (TW)

(*) Notice: Subject to any disclaimer, the term of this patent is extended or adjusted under 35 U.S.C. 154(b) by 436 days.

This patent is subject to a terminal disclaimer.

(21) Appl. No.: 13/398,687

(22) Filed: Feb. 16, 2012

(65) Prior Publication Data

US 2013/0138933 A1 May 30, 2013

(30) Foreign Application Priority Data

Nov. 30, 2011 (CN) .......................... 2011 1 0391680

(51) Int. Cl.
*G06F 9/00* (2006.01)
(52) U.S. Cl.
USPC ............................................................. 713/1
(58) Field of Classification Search
USPC ............................................................. 713/1
See application file for complete search history.

(56) References Cited

U.S. PATENT DOCUMENTS

| 8,386,764 B2* | 2/2013 | Li et al. ........................ 713/100 |
| 2009/0132799 A1* | 5/2009 | Brumley et al. ............... 713/100 |
| 2013/0138940 A1* | 5/2013 | Wang ................................ 713/2 |

FOREIGN PATENT DOCUMENTS

| CN | 101751265 A | 6/2010 |
| CN | 101902355 A | 12/2010 |
| CN | 102081526 A | 6/2011 |

* cited by examiner

*Primary Examiner* — Kim Huynh
*Assistant Examiner* — Eric Chang
(74) *Attorney, Agent, or Firm* — CKC & Partners Co., Ltd.

(57) ABSTRACT

A computer system including a central processing unit (CPU), a chipset connected to the CPU, a baseboard management controller (BMC) connected to the chipset, and a basic input/output system (BIOS) unit connected to the BMC is provided. The BMC switches a connection mode which the BMC connecting to the BIOS unit between a local mode and a bypass mode. The BIOS unit communicates with the chipset directly when the connection mode is switched to the bypass mode. When reading a BIOS information of the BIOS unit is needed, the BMC switches the connection mode to the local mode, communicates with the BIOS unit directly and read the BIOS information directly.

20 Claims, 3 Drawing Sheets

COMPUTER SYSTEM FOR SELECTIVELY ACCESSING BIOS BY A BASEBOARD MANAGEMENT CONTROLLER

CROSS-REFERENCE TO RELATED APPLICATION

This application claims the priority benefit of China application serial no. 201110391680.0, filed on Nov. 30, 2011. The entirety of the above-mentioned patent application is hereby incorporated by reference herein and made a part of this specification.

BACKGROUND OF THE INVENTION

Technical Field

The present invention relates to a computer system. Specifically, the present invention relates to a method for reading basic input/output system (hereinafter "BIOS") and a computer system using the method.

Due to the rapid development of personal computers in recent years, new peripheral equipments are introduced to the market. To enhance the computing speed and function of the computer systems, or to solve the deficiency or error of the hardware design, computer systems need to read the BIOS to check whether the BIOS is damaged or needs to be updated, or to provide information for other operations.

The existing BIOS reading methods are complicated, and some of the methods can only be executed when the computer system is powered on. Therefore, the industry needs to provide faster and more instant method to handle the issue of reading BIOS in personal computer systems.

SUMMARY OF THE INVENTION

Based on the above, the present invention provides a computer system, which automatically switches between the local mode and the bypass mode by the baseboard management controller ("BMC") to enable the baseboard management controller to read the information of the BIOS unit directly.

The present invention provides a computer system, which includes a central processing unit, a chipset connected to the central processing unit, a baseboard management controller connected to the chipset and a basic input/output system unit (BIOS unit) connected to the baseboard management controller. The baseboard management controller switches a connection mode of the baseboard management controller with the basic input/output system unit between the local mode and the bypass mode. In the bypass mode, the basic input/output system unit communicates with the chipset directly. When there is a need to read the basic input/output system unit information, the baseboard management controller switches the connection mode with the basic input/output system unit to the local mode. The baseboard management controller communicates with the basic input/output system unit directly, and directly reads the basic input/output system unit information.

According to the aforementioned, the computer system provided in the present invention enables the central processing unit to directly read the BIOS information in the BIOS unit in the bypass mode, by using the function of the baseboard management controller of automatically switching between the local mode and the bypass mode. Under the local mode, the baseboard management controller may directly access the BIOS unit to more conveniently and quickly use the BIOS information under any state of the computer system.

In order to make the aforementioned and other features and advantages of the invention more comprehensible, several embodiments accompanied with figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DETAILED DESCRIPTION OF DISCLOSED EMBODIMENTS

Figure 1:
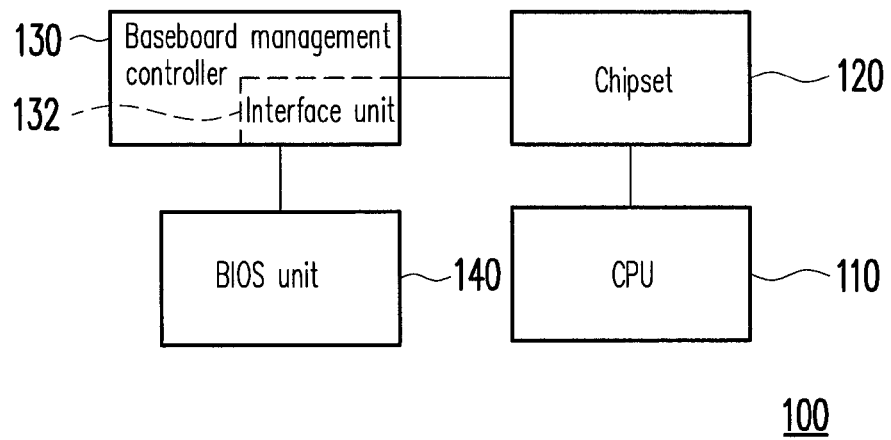
FIG. 1 is a function block diagram of a computer system according to an embodiment of the present invention.

FIG. 1 is a function block diagram of a computer system according to an embodiment of the present invention. Referring to FIG. 1, the computer system 100 includes a central processing unit (CPU) 110, a chipset 120, a baseboard management controller (BMC) 130, and a BIOS unit 140. The chipset is connected to the central processing unit 110 and the baseboard management controller 130 respectively. The BIOS unit 140 is connected to the baseboard management controller 130. The BIOS unit 140 may be, for example, a non-volatile memory. For the present computer system, the non-volatile memory may be, for example, a flash memory.

Additionally, the baseboard management controller 130 of the present invention may have a interface unit 132. The baseboard management controller 130 switches a connection mode of the baseboard management controller 130 with the BIOS unit 140 by switching the interface unit 132. The connection mode of the baseboard management controller 130 and the BIOS unit 140 includes the local mode or the bypass mode. The difference between the local mode and the bypass mode will be explained as follows.

Figure 2:
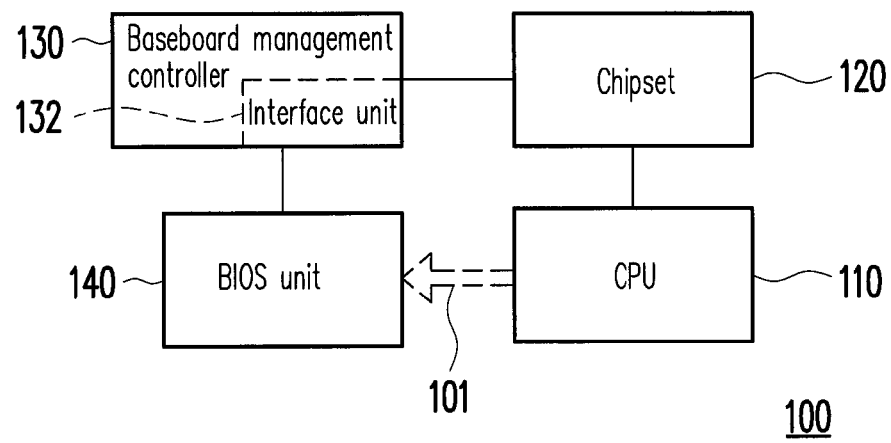
FIG. 2 is a schematic view of the data flow of the central processing unit under the local mode according to an embodiment of the present invention.

When the interface unit 132 is in the bypass mode, the interface unit 132 is switched to enable the BIOS unit 140 to communicate with the chipset 120 directly. For example, the chipset 120 in this embodiment is a platform controller hub (PCH) unit, and the interface unit 132 of the baseboard management controller 130 is a serial peripheral interface (SPI) unit. The BIOS unit 140 and the PCH unit, i.e., the chipset 120, connect to the interface unit 132 by a SPI line, respectively. That is, when the interface unit 132 is under the bypass mode, the BIOS unit 140 connects to the PCH unit directly. Also, when the computer system 100 is powered on, the central processing unit 110 directly reads the content of the BIOS information from the BIOS unit 140 by SPI unit of the baseboard management controller 130, and enters the start-up mode. (as shown by the data flow 101 in FIG. 2.) The content of the BIOS information may be the program code of the BIOS firmware.

When it is needed to read the BIOS information, the baseboard management controller 139 switches the interface unit 132 to switch the connection mode from the bypass mode to the local mode. At this time, the baseboard management controller 130 communicates with the BIOS unit 140 directly, and may directly read the BIOS information from the BIOS unit 140 and store such the BIOS information in the baseboard management controller 130 to be used. The BIOS information may be, for example, a BIOS image file. It is to be noted that if the baseboard management controller 130 still wants to communicate with the BIOS unit 140 in the bypass mode, the connection mode does not have to be switched back to the local mode. The baseboard management controller 130 may view the BIOS unit 140 by merely using the chipset 120 as a bridge.

In order to further explain how the computer system reads the BIOS information by the baseboard management controller 130, another embodiment is provided for illustration.

Figure 3:
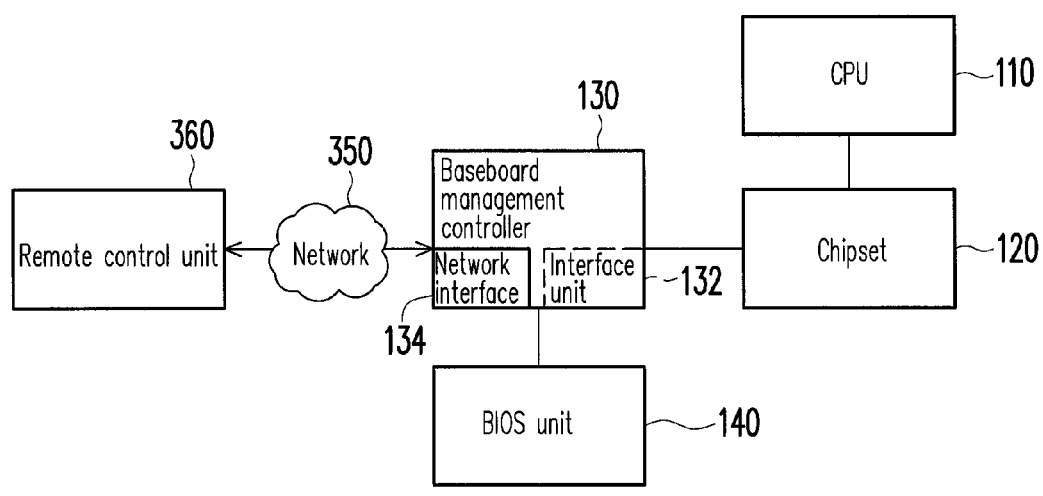
FIG. 3 is a function block diagram of a computer system according to an embodiment of the present invention.

FIG. 3 is a function block diagram of a computer system according to an embodiment of the present invention. Referring to FIG. 3, the computer system 300 in the present embodiment differs from the computer system 100 in FIG. 1 in: the baseboard management controller 130 further includes a network interface 134. The baseboard management controller 130 may connect to a network 350 via the network interface 134. The network 350 may be a network of any form, including Web, file transfer protocol (FTP) network, trivial file transfer protocol (TFTP) network, secure shell (SSH) network, etc, and is not limited herein.

The baseboard management controller 130 further communicates with a remote control unit 360 by the network 350. The network interface 1354 may be an outband network interface or an inband network interface. If the network interface 134 is an outband network interface, the network interface 134 directly connects to the baseboard management controller 130. If the network interface 134 is an inband network interface, the network interface 134 connects to the chipset 120. That is, the baseboard management controller communicates with the remote control unit 360 by the sideband method.

In this embodiment, the remote control unit 360 may be configured to another electronic device or a server system with the same hardware structure, and is not limited herein. When a power-on failure or BIOS information damage occurs to the electronic device (not shown) that the remote control unit 360 belongs to, or to other electronic devices connected to the server (not shown), the remote control unit 360 generates a reading request and transmits the reading request to the baseboard management controller 130 via the network 350. In addition, the reading request can be generated by the user's controlling the remote control unit 360. When the baseboard management controller 130 receives the reading request from the remote control unit 360 via the network 350 and the network interface 134, switch the interface unit 132 to the local mode, and directly read and obtain the BIOS information in the BIOS unit 140. The BIOS information may be, for example, an image file of the BIOS firmware program code. The baseboard management controller 130 stores the BIOS information, and transmits the BIOS information to the remote control unit 360 via the network 350.

In this embodiment, after the baseboard management controller 130 finishes transmitted the BIOS information to the remote control unit 360, the baseboard management controller 130 switches its connection mode with the BIOS unit 140 from the local mode back to the bypass mode. The BIOS unit 140, which is switched back to the bypass mode, may communicate with the chipset 120.

It is to be noted that in this embodiment, the baseboard management controller 130 continues working no matter the central processing unit 110 is under a work mode or a power-off mode. Therefore, the baseboard management controller 130 may immediately answer the reading request from the remote control unit 360. In another embodiment, if the BIOS information that the baseboard management controller 130 stores is the BIOS information stored in the BIOS unit 140 and read from the BIOS unit 140 within a preset time frame, when receiving the reading request, the baseboard management controller 130 directly transmits back to the stored BIOS information in order to response the read request of the remote control unit 360 within a shortest period of time. The setting of the preset time frame depends on the actual situation.

Figure 4:
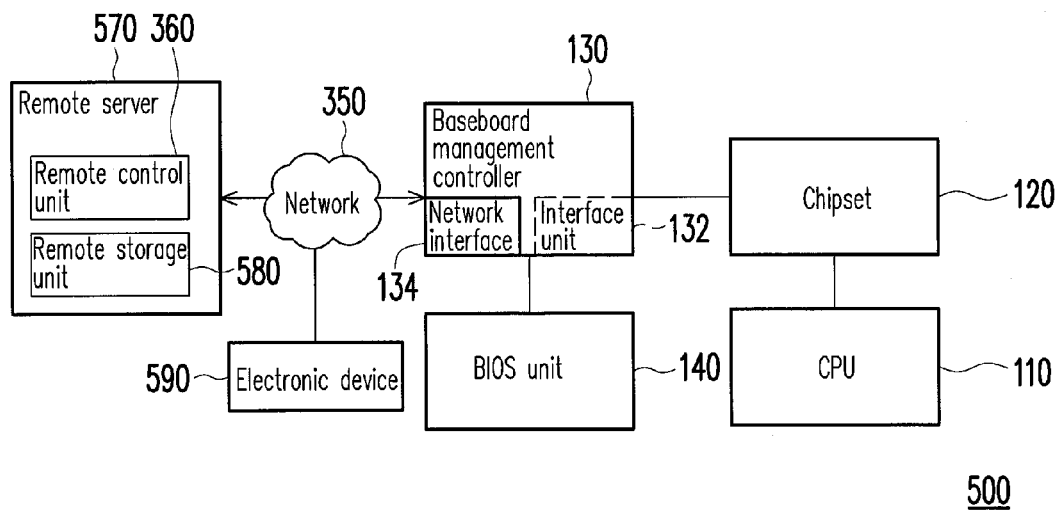
FIG. 4 is a function block diagram of a computer system according to another embodiment of the present invention.

Here is another exemplary embodiment. FIG. 4 is a function block diagram of a computer system according to another embodiment of the present invention. Referring to FIG. 4, the computer system 500 in the present embodiment differs from the computer system 300 in FIG. 3 in: the remote control unit 360 is within a remote server 570, and the remote server further includes a remote storage unit 580. The computer system 500 further includes one or more electronic devices (for example, electronic device 590), connected to the remote server 570 via the network 350. The remote storage unit 580 may be, for example, any type of fixed or portable random access memory (RAM), read-only memory (ROM), flash memory, hard disk . . . etc.

When the remote server 570 receives the BIOS information transmitted from the baseboard management controller 130, the electronic device 570 stores the BIOS information into the remote storage unit 580. When power-on failure or BIOS information damage occurs to the other electronic devices connected to the remote server 570, such as the electronic device 590, the electronic device 590 generates a reading request and transmits the reading request to the remote server 570 via the network 350. After the remote controller 570 receives such reading request, the remote controller reads the BIOS information from the remote storage unit 580 and transmits the BIOS information to the electronic device 590 via the network 350, in order to update the BIOS information of the electronic device 590 to resolve the issues of power-on failure or BIOS information damage of the electronic device 590.

As a result, when the issues of power-on failure or BIOS information damage occur to each electronic device (not shown) connected to the remote server 570 via the network, such issues may be resolved by reading the BIOS information on the remote storage unit 580 of the remote server 570. The remote server 570 may confirm that the already properly working BIOS unit, such as the BIOS unit 140, is able to read the BIOS information that works properly. In addition, the manager of the remote server 570 may store the updated BIOS information to the remote storage unit 580 to enable other electronic devices, such as electronic device 590, to update the BIOS information. If the updated BIOS information encounters issues of damage or power-on failure issues, the electronic device 590 may immediately resolve the power-on failure issue by immediately reading the properly working BIOS information, which is transmitted back from the baseboard management controller 130, from the remote storage unit 580. It is to be noted that the electronic device 590 must include structures similar to the central processing unit 110, the chipset 120, the baseboard management controller 130 or the BIOS unit 140, to use the BIOS information transmitted from the baseboard management controller 130.

The present invention further provides two different remote connection methods. In one embodiment, the computer system further includes a keyboard controller style (KCS) interface. The keyboard controller style unit is coupled to the keyboard controller style interface. The baseboard management controller communicates with the keyboard controller style unit via the keyboard controller style interface. The baseboard management controller receives a BIOS information reading request from the keyboard controller style unit, and switches the connection mode to the local mode to conduct read according to the BIOS information read request.

In another embodiment, the baseboard controller is connected to an intelligent platform management bus (IPMB) interface. A control unit is coupled to the intelligent platform management bus interface. The baseboard management controller communicates with the control unit via the intelligent platform management bus interface.

Based on the aforementioned, the present invention provides the function of automatically switching between the local mode and the bypass mode by the baseboard management controller. When the baseboard management controller is in the bypass mode, the central processing unit may directly reads the BIOS information content in the BIOS unit. When the baseboard management controller is in the local mode, the baseboard management controller may directly access the BIOS unit and read the BIOS content, and further transmit the BIOS content to the remote electronic device or server via the network. When BIOS damage occurs to other electronic devices of similar structure, the BIOS information can be read and copied to be used. In addition, the switching between the local mode and the bypass mode of the present invention is unrelated to the operation mode of the central processing unit. As long as the system is restarted after the BIOS unit completes the update to enable the updated BIOS content to take effect, the effect on the operation time of the computer system will be lessened.

Although the present invention has been described with reference to the above embodiments, it will be apparent to one of the ordinary skill in the art that modifications to the described embodiment may be made without departing from the spirit of the present invention. Accordingly, the scope of the present invention will be defined by the attached claims not by the above detailed descriptions.

What is claimed is:

1. A computer system, comprising:
a central processing unit;
a chipset, connected to the central processing unit;
a baseboard management controller, connected to the chipset; and
a basic input/output system unit, connected to the baseboard management controller,
wherein the baseboard management controller switches a connection mode of the baseboard management controller with the basic input/output system unit between a local mode and a bypass mode, and
when in the bypass mode, the basic input/output system unit communicates with the chipset directly, and
when reading a basic input/output system information is needed, the baseboard management controller switches a connection mode to the local mode to communicate with the basic input/output system unit directly and directly reads the basic input/output system information from the basic input/output system unit.

2. The computer system according to claim 1, wherein when finished reading the basic input/output system information, the baseboard management controller switches the connection mode with the basic input/output system unit to the bypass mode.

3. The computer system according to claim wherein the basic input/output system unit is a flash memory.

4. The computer system according to claim 1, wherein a process of the baseboard management controller switching between the local mode and the bypass mode and communicating with the basic input/output system unit is independent from a work mode of the central processing unit.

5. The computer system according to claim 1, wherein
when the central processing unit is under a work mode or a power-off mode, the baseboard management controller maintains under the work mode, and
when reading the basic input/output system information is needed, the baseboard management controller switches the connection mode to the local mode and directly reads the basic input/output system information from the basic input/output system.

6. The computer system according to claim 1, wherein the baseboard management controller is connected to a network interface, a remote control unit is coupled to the network interface, the baseboard management controller communicates with the remote control unit by the network interface, and
when reading the basic input/output system information is needed, the baseboard management controller receives a the basic input/output system unit reading request from the remote control unit and switches the connection mode to the local mode according to the basic input/output system unit reading request.

7. The computer system according to claim 6, wherein the baseboard management controller further reads the basic input/output system information, and transmits the basic input/output system information to the remote control unit.

8. The computer system according to claim 6, wherein the baseboard management controller further reads the basic input/output system information and transmits the basic input/output system information to a remote storage unit.

9. The computer system according to claim 6, wherein the BIOS information is stored in the baseboard management controller.

10. The computer system according to claim 6, wherein the network interface is an outband network interface, which connects directly to the baseboard management controller.

11. The computer system according to claim 6, wherein the network interface is an inband network interface, the inband network interface is connected to the chipset, the baseboard management controller communicates with the remote control unit by a sideband way.

12. The computer system according to claim 1, wherein the baseboard management controller reads the basic input/output system unit information periodically, and
when reading the basic input/output system unit information, the baseboard management controller switches the connection mode with the basic input/output system unit to the local mode.

13. The computer system according to claim 12, wherein the baseboard management controller connects to a network interface, a remote information storage unit is coupled to the network interface,
and when finished reading the basic input/output system information, the baseboard management controller transmits the basic input/output system unit information to the remote information storage unit.

14. The computer system according to claim 12, wherein the network interface is an outband network interface, which connects directly to the baseboard management controller.

15. The computer system according to claim 12, wherein the network interface is an inband network interface, which is connected to the chipset, and the baseboard management controller communicates with the remote information storage unit by a sideband way.

16. The computer system according to claim 1, further comprising a keyboard controller style interface, a keyboard controller style unit is coupled to the keyboard controller standard interface, the baseboard management controller communicates with the keyboard controller standard unit through the keyboard controller standard interface, wherein the baseboard management controller receives a basic input/output system reading request from the keyboard controller style unit and switches the connection mode to the local mode according to the basic input/output system reading request.

17. The computer system according to claim 1, wherein the baseboard management controller is connected to a intelligent platform management bus interface, a control unit is coupled to the intelligence platform management bus interface, the baseboard management controller communicates with the control unit through the intelligence platform management bus interface.

18. The computer system according to claim 1, wherein the baseboard management controller comprises an interface unit, the baseboard management controller switches the local mode or the bypass mode of the interface unit to change the connection mode with the basic input/output system unit.

19. The computer system according to claim 1, wherein the chipset is a platform controller hub unit, the interface unit of the baseboard management controller is a serial peripheral interface unit, the basic input/output system unit and the platform controller hub unit each connects to the interface unit by a serial peripheral interface line, and when the interface unit is under the bypass mode, the basic inputioutput system unit communicates with the platform controller hub unit directly.

20. The computer system according to claim 1, wherein when in the bypass mode, the baseboard management controller communicates with the basic input/output system unit by the chipset.

* * * * *